United States Patent
Seo et al.

[11] Patent Number: 5,890,065
[45] Date of Patent: Mar. 30, 1999

[54] ROUTING INFORMATION GENERATION METHOD FOR USE IN A MOBILE COMMUNICATIONS SYSTEM

[75] Inventors: Weon-Ho Seo; Su-Jeung Choi, both of Incheon, Rep. of Korea

[73] Assignee: Daewoo Telecom, Ltd., Incheon, Rep. of Korea

[21] Appl. No.: 769,834

[22] Filed: Dec. 20, 1996

[30] Foreign Application Priority Data

Dec. 21, 1995 [KR] Rep. of Korea .................. 1995 53311

[51] Int. Cl.$^6$ ....................................................... H04Q 7/38
[52] U.S. Cl. ............................................................ 455/445
[58] Field of Search ............................. 455/445; 379/201

[56] References Cited

U.S. PATENT DOCUMENTS

| | | | |
|---|---|---|---|
| 5,600,704 | 2/1997 | Ahlberg et al. | 379/201 |
| 5,621,783 | 4/1997 | Lantto et al. | |
| 5,711,006 | 1/1998 | Brochu et al. | 455/445 |

FOREIGN PATENT DOCUMENTS

| | | |
|---|---|---|
| 2254521 | 10/1992 | United Kingdom . |
| 9501074 | 1/1995 | WIPO . |

OTHER PUBLICATIONS

Ballard & Issenmann, "Digital Cellular Mobile Radio System ECR900", European Transacxtions Telecommunications and Related Technologies, Jan. 1990.

*Primary Examiner*—William Cumming
*Attorney, Agent, or Firm*—Pennie & Edmonds LLP

[57] ABSTRACT

A method, for use in a mobile communications system (MCS), efficiently generates routing information when a caller of a first electronic switching system (ESS) calls a receiver's phone connected to a second ESS through a base station system, wherein the routing information is used for the first ESS to choose one of a plurality of transit networks (TN's) formed between the ESS's to communicate voice messages and/or data between the caller and the receiver. At a first step, if there is a first demand signal from the first ESS, roaming information representing the location of the receiver is derived, wherein the first demand signal is generated when an identification code, indicating that the receiver is a mobile subscriber, is received by the first ESS from the caller. At a subsequent step, there is selectively generated first TN selection data based on subscriber information which is predetermined by each of the caller and the receiver or second TN selection data which is predetermined by the MCS, wherein each TN selection data denotes one of the TN's. At a final step, the produced first or second TN selection data and the derived roaming information are formatted to thereby gener ate the routing information.

9 Claims, 3 Drawing Sheets

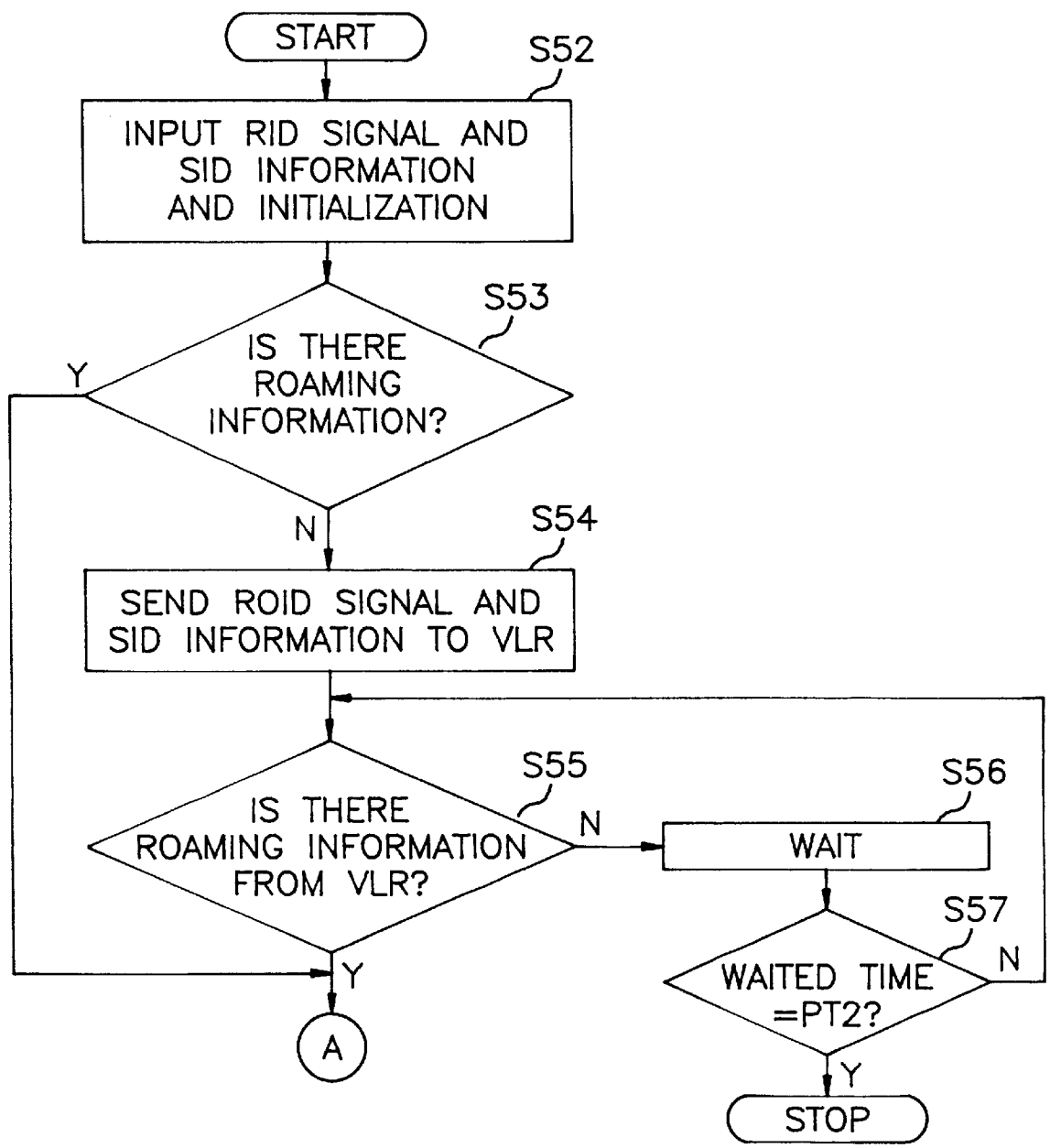

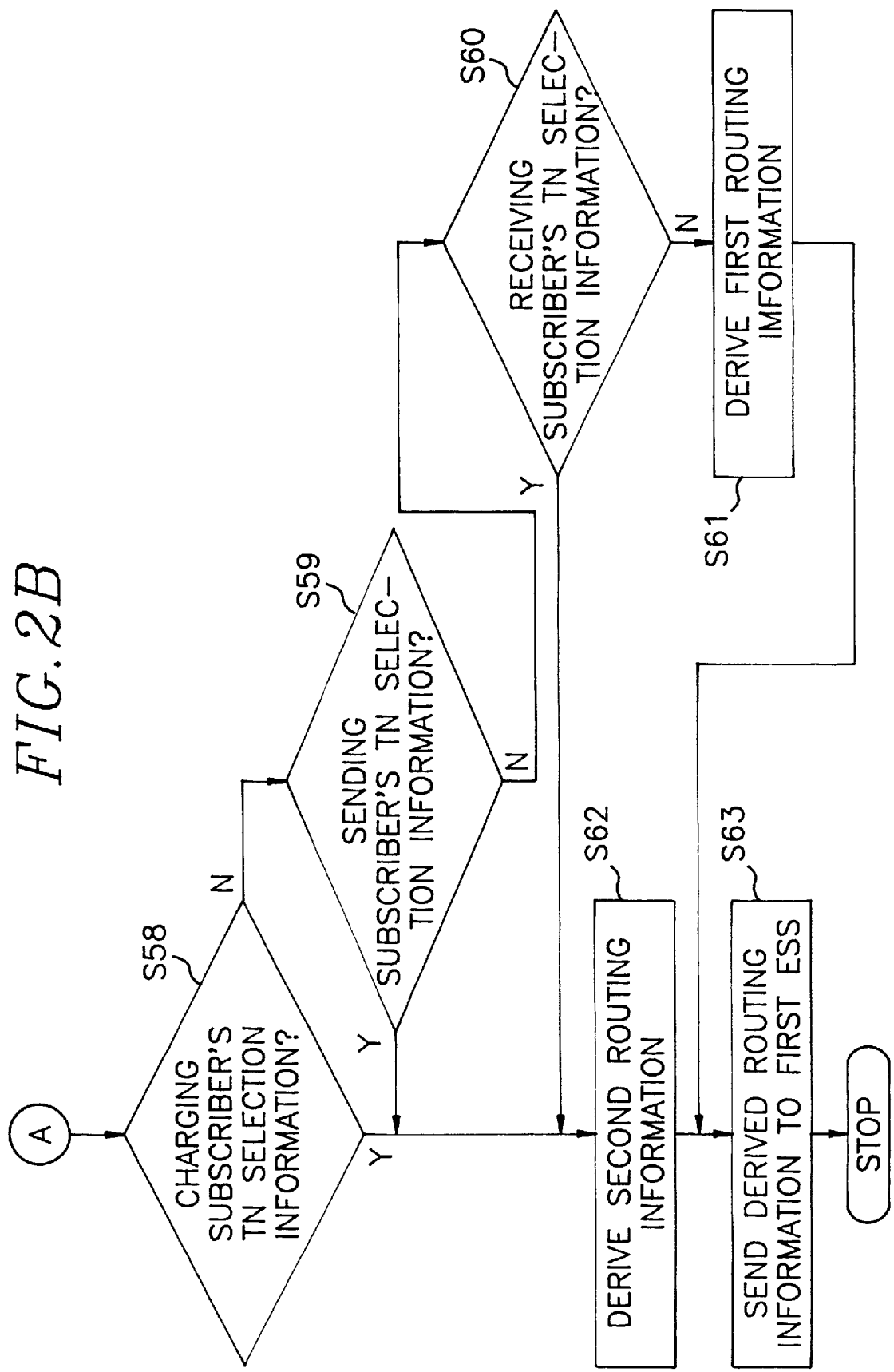

ROUTING INFORMATION GENERATION METHOD FOR USE IN A MOBILE COMMUNICATIONS SYSTEM

FIELD OF THE INVENTION

The present invention relates to a mobile communications system; and, more particularly, to a method for effectively generating routing information to be used to provide an optimum communications path between two assigned subscribers of the system.

BACKGROUND OF THE INVENTION

It is well known that a mobile communications system (MCS) offers various services such as cellular phone service, radio pager service and the like to subscribers connected to the MCS by radio. Basic components of the MCS include a first and a second electronic switching systems (ESS's), a plurality of transit networks (TN's), a base station system (BSS) and a mobile station (MS). The TN's are provided by TN companies and each TN contains one or more other ESS's to be used for relaying voice messages and/or data between the first and the second ESS's and trunks coupled between the other ESS's. Both or either one, e.g., the second ESS, of the first and the second ESS's is capable of handling voice messages and/or data transmitted from the subscribers connected thereto.

When a public switched telephone network (PSTN) subscriber of the first ESS lifts his telephone handset and inputs a dial number of, e.g., the MS subscriber, to make a call, the first ESS receives and processes digits corresponding to the dial number. In the MCS, the dial number is commonly comprised of a network identification (NID) code, a country code, an area code, a station code and a subscriber number, wherein the NID code is a service type code indicating one of various communications services such as cordless phone service, radio pager service, cellular phone service and the like.

Specifically, if the NID code in the dial number is received by the first ESS, it first translates the received NID code to identify the receiving subscriber, i.e., the MS subscriber, as either a PSTN subscriber or a mobile subscriber. And if the MS subscriber is identified as the mobile subscriber based on the translated result, the first ESS sends a routing information demand (RID) signal and subscriber identification (SID) information representing the MS subscriber to a home location register (HLR) connected between the two ESS's; and, if otherwise, it relays voice signals and/or data from the PSTN subscriber to the second ESS.

In response to the RID signal, the HLR retrieves TN selection data, predetermined by the MCS and stored in a memory of the HLR, to be used by the first ESS to choose one of the TN's. Further, in response to the SID information, the HLR retrieves roaming information related to the MS subscriber's current location from a set of roaming information which is predetermined by mobile subscribers of the second ESS and stored in the memory of the HLR. After retrieving both the TN selection data and the roaming information, the HLR formats them by using a conventional data format scheme to obtain and provide routing information to the first ESS.

The first ESS chooses one of the TN's in response to the TN selection data in the routing information so that the PSTN subscriber of the first ESS can communicate with the MS subscriber of the second ESS through the selected TN based on the roaming information in the routing information. For interfacing the second ESS with the MS, the BSS is connected therebetween, wherein the BSS contains a base transceiver station and a base station controller and there are used a radio, an A and an A-bis interfaces issued at Open Systems Interconnection (OSI).

However, in the conventional routing information generation method provided in the MCS, the TN selection data employed to select one of the TN's is determined by the MCS only, resulting in a communications path which is not fully optimized for the PSTN and MS subscribers.

SUMMARY OF THE INVENTION

It is, therefore, a primary object of the present invention to provide a method, for use in an MCS, for generating routing information based on a set of subscriber information offered by two assigned subscribers of the MCS to thereby establish an optimum communications path between the subscribers.

In accordance with the present invention, there is provided a method, for use in a mobile communications system (MCS), for generating routing information when a caller of a first electronic switching system (ESS) calls a receiver's phone connected to a second ESS through a base station system, wherein the routing information is used by the first ESS to choose one of a plurality of transit networks (TN's) formed between the ESS's to communicate voice messages and/or data between the caller and the receiver, each TN having one or more other ESS's and trunks coupled between them, the method comprising the steps of:

(a) if there is a first demand signal from the first ESS, deriving roaming information representing the location of the receiver, wherein the first demand signal is generated when an identification code, indicating that the receiver is a mobile subscriber, is received by the first ESS from the caller, the identification code being contained in a dial number of the receiver's phone;

(b) selectively producing first TN selection data based on subscriber information which is predetermined by each of the caller and the receiver or second TN selection data which is predetermined by the MCS, wherein each TN selection data denotes one of the TN's; and (c) formatting the produced first or second TN selection data and the derived roaming information to thereby generate the routing information.

BRIEF DESCRIPTION OF THE DRAWINGS

The above and other objects and features of the present invention will become apparent from the following description of preferred embodiments given with reference to the accompanying drawings, in which:

FIGS. 2A and 2B present flow charts illustrating the procedure for generating routing information at an HLR shown in FIG. 1.

DETAILED DESCRIPTION OF THE PREFERRED EMBODIMENTS

Figure 1:
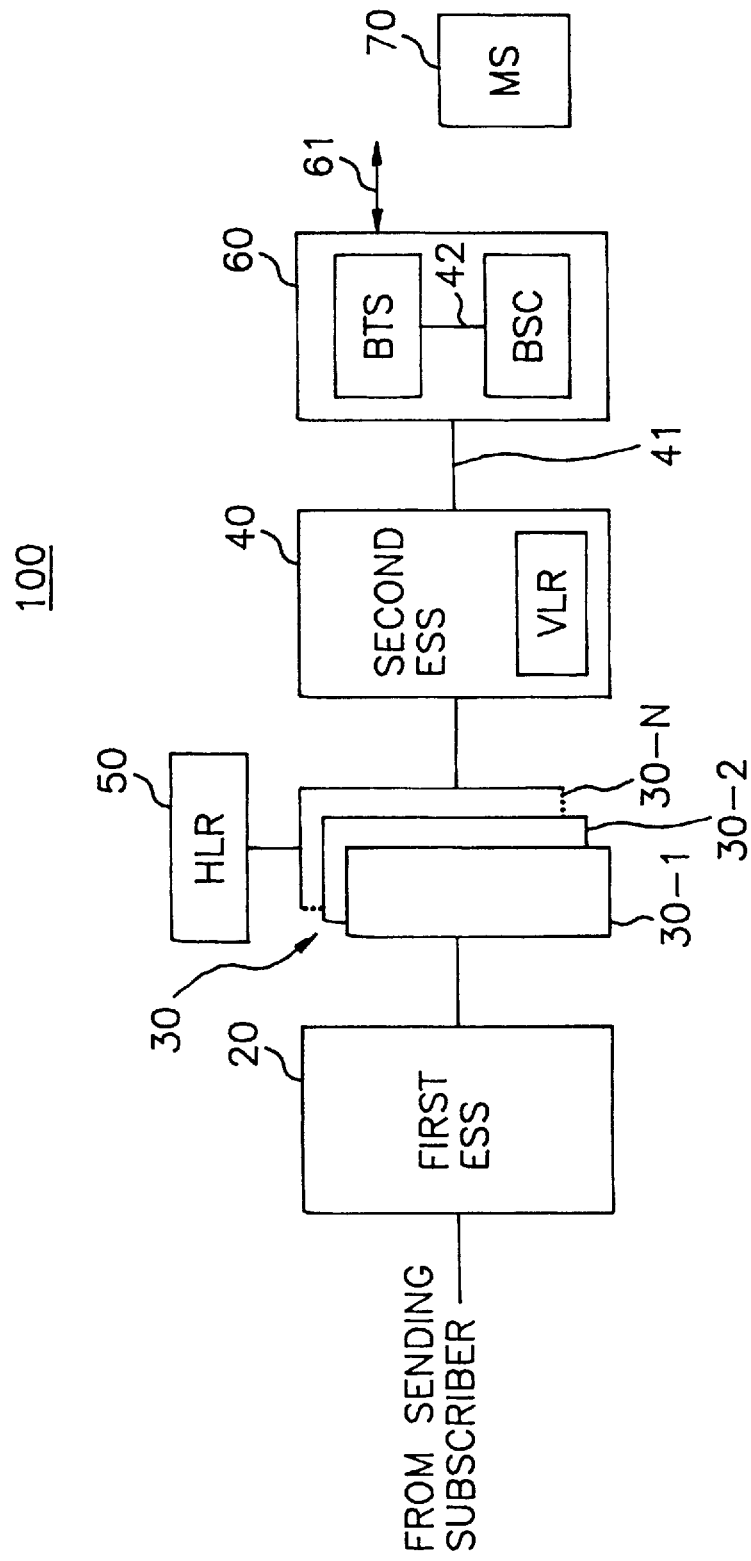
FIG. 1 shows a schematic block diagram of an MCS incorporating therein a routing information generation method in accordance with the present invention.

Referring to FIG. 1, there is provided a block diagram of a novel MCS 100 incorporating therein a routing information generation method in accordance with the present invention. The MCS 100 comprises a first and a second ESS's 20 and 40, a TN module 30 having N TN's, 30-1 to 30-N, an HLR 50, a base station system (BSS) 60 which includes a base station controller (BSC) and a base transceiver station (BTS), and an MS 70, wherein N is a positive integer. For the sake of illustration, it is assumed that the first ESS 20 is an ordinary ESS for accommodating PSTN subscribers, and the second ESS 40 is a mobile switching center which is capable of handling voice messages and/or data from mobile subscribers connected thereto and contains a visitor location register (VLR). Even though there is not substantially shown for the sake of simplicity, it should be apparent to those skilled in the art that each of the TN's includes one or more other ESS's to be used for relaying voice messages and/or data to be communicated between the two ESS's 20 and 40 and trunks formed between the other ESS's. For the sake of simplicity, the inventive method will be described with reference to the two ESS's 20 and 40 selected from a plurality of ESS's within the MCS 100, one HLR 50 in the MCS 100, one BSC and BTS chosen from multiple BSC's and BTS's within the BSS 60, and one MS 70 out of many coupled with the BSS 60 through a Radio interface 61 issued by OSI.

When a PSTN subscriber of the first ESS 20 lifts his telephone handset (not shown) and inputs a dial number of the MS 70 to make a call, the first ESS 20 receives and processes digits corresponding to the dial number. In the MCS 100, the dial number commonly contains a network identification (NID) code, a country code, an area code, a station code and a subscriber number, wherein the NID code is a service type code indicating one of communications services such as a cordless phone service, a radio pager service, a cellular phone service and the like. Specifically, when the NID code in the dial number is received by the first ESS 20, it first translates the received NID code to identify the receiving subscriber, i.e., the MS subscriber, as either a PSTN subscriber or a mobile subscriber. If the MS subscriber is identified as the mobile subscriber based on the translated result, then the first ESS 20 transmits an RID signal and SID information representing the PSTN and the MS subscribers to the HLR 50 through a default TN, e.g., 30-1, of the TN's 30-1 to 30-N.

In response to the RID signal from the first ESS 20, the HLR 50 generates routing information by using the SID information and a set of subscriber information which is predetermined by subscribers of the first and the second ESS's 20 and 40 and stored in a memory (not shown) of the HLR 50. As is well known, each subscriber information includes TN selection data indicating one of the TN's and charging data when both of the data are registered by its corresponding subscriber in advance. And, if the corresponding subscriber is a mobile subscriber, each subscriber information further includes roaming information representing current location of the corresponding subscriber. Since registration of the TN selection data, the charging data and the roaming information may be made by using a conventional subscriber information registration technique, details of which are omitted here for the sake of simplicity. Generation of the routing information is carried out by using a novel routing information generation scheme in accordance with the invention, which will be described in detail with reference to FIGS. 1, 2A and 2B.

Subsequently, the routing information generated at the HLR 50 is sent to the first ESS 20, wherein one of the TN's is selected in response to the TN selection data contained in the routing information, thereby transmitting voice messages and/or data from the PSTN subscriber to the second ESS 40 through the selected TN. If no routing information is received by the first ESS 20 for a first predetermined time period PT1, e.g., 5 sec, after transmitting the RID signal and the SID information to the HLR 50, the process is no longer performed in the MCS 100, wherein PT1 is a positive number. As mentioned above, the second ESS 40 is equipped with the VLR that temporarily stores a set of roaming information instantly updated by the second ESS 40 in a memory (not shown) thereof, thereby the roaming information in the set including more currently updated roaming information than the roaming information in the HLR 50. Although it is not explained in detail for the sake of simplicity, it should be appreciated that the VLR may be linked to one or more ESS's, and all of the roaming information in the VLR can be registered and changed by utilizing a conventional roaming information registration and change scheme.

The voice messages and/or data received by the second ESS 40 is then sent via an A interface 41 issued at the OSI to the BSS 60 that interfaces the voice messages and/or data with the MS 70 through the Radio interface 61. As is well known in the art, the BSC included in the BSS 60, which is connected with the second ESS 40 via the A interface 41 and coupled with the BTS via an A-bis interface 42, controls the operation of the BTS, wherein the A-bis interface is provided at the OSI. The BTS in the BSS 60, which is connected with the BSC via the A-bis interface 42 and coupled with the MS 70 via the Radio interface 61, encodes the voice messages and/or data and performs rate adaptation for transferring the encoded voice messages and/or data to the MS 70. The voice messages and/or data processed by the BTS is then sent to the MS 70 through the Radio interface 61, thereby establishing a communications path to communicate voice messages and/or data between the PSTN subscriber of the first ESS 20 and the MS subscriber of the second ESS 40.

With reference to FIGS. 1, 2A and 2B, the method in accordance with the present invention for generating the routing information will now be described in detail.

As shown in FIG. 2A, at step S52, the inventive process is initiated when the RID signal and the SID information are received by the HLR 50 through the TN 30-1 from the first ESS 20. At step S53, the HLR 50 checks if the roaming information representing the location of the MS subscriber is in the set of subscriber information stored in the memory thereof. If it is in the set, the process goes to step S58 shown in FIG. 2B through a tap A; but if not, at a next step S54, the HLR 50 issues a roaming information demand (ROID) signal and the SID information on the MS subscriber to send them to the VLR of the second ESS 40. The VLR, based on the ROID signal and the SID information, selects one of the roaming information in the set stored in the memory thereof.

Thereafter, at step S55, the HLR 50 monitors and tests whether there is roaming information from the VLR. If the roaming information is received by the HLR 50 at step S55, the process proceeds to step S58 through the tap A; and, if otherwise, it goes to step S56 to wait for a predetermined delay time and at a next step S57, the HLR 40 checks if the total accumulated delayed time reaches to a second predetermined time period PT2, e.g., 5 sec, wherein PT2 is a positive number. If the checked result is NO, the process returns back to step S55 to check for the roaming information. However, at step S57, if the checked result is YES, the whole process is stopped.

As shown in FIG. 2B, at step S58, the process first decides whether a charging subscriber is the PSTN subscriber or the MS subscriber based on charging data included in each of the PSTN subscriber information and the MS subscriber information in the set of subscriber information. For instance, if both of the PSTN and the MS subscribers are registered as charging subscribers in the memory, in accordance with the invention, the receiving subscriber, i.e., the MS subscriber is regarded as the charging subscriber, and if otherwise, the charging subscriber is decided on the basis of the charging data in the PSTN and the MS subscriber information. After deciding the charging subscriber, at step S58, the process checks if there is TN selection data in the subscriber information of the charging subscriber, wherein the TN selection information indicates one of the TN's as set forth above. If the checked result is affirmative, the process goes to step S62, and, if otherwise, i.e., if there is no TN selection data, it proceeds to step S59, wherein the HLR 50 tests whether there is TN selection data in the subscriber information of the sending subscriber, i.e., the PSTN subscriber.

At step S59, if the tested result is YES, the process goes to step S62, and if otherwise, it proceeds to step S60 where the HLR 50 checks whether there is TN selection data in the subscriber information of the receiving subscriber, i.e., the MS subscriber. At step S60, if the TN selection data is in the subscriber information of the MS subscriber, the process goes to step S62, but if not, it proceeds to step S61 where the HLR 40 derives first routing information by formatting the selected roaming information and TN selection data stored in the memory, indicating the default TN, i.e., 30-1, and then goes to step S63.

At step S62, if there is the TN selection data from any one of steps S58 to S60, the HLR 40 derives second routing information by formatting the TN selection data and the selected roaming information. Subsequently, the process goes to step S63 where the HLR 40 transmits the routing information derived at either one of steps S61 and S62 to the first ESS 20, and then the inventive whole process is stopped. As shown above, therefore, the present invention can effectively produce routing information by using subscriber information which is registered by sending and receiving subscribers, thereby offering a better communications service to the subscribers.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in a mobile communications system (MCS), for generating routing information when a caller of a first electronic switching system (ESS) calls a receiver of a second ESS, wherein the routing information is used by the first ESS to choose one of a plurality of transit networks (TN's) between the ESS's, each TN having one or more other ESS's and trunks coupled between them, the method comprising the steps of:

(a) if there is a roaming information demand signal from the first ESS, deriving roaming information representing the location of the receiver, wherein the roaming information demand signal is generated when an identification code, indicating that the receiver is a mobile subscriber, is received by the first ESS from the caller, the identification code being contained in a dial number of the receiver;

(b) selectively producing first TN selection data based on subscriber information which is predetermined by each of the caller and the receiver or second TN selection data which is predetermined by the MCS, wherein each TN selection data denotes one of the TN's; and (c) formatting the produced first or second TN selection data and the derived roaming information to thereby generate the routing information.

2. The method of claim 1, wherein the step (b) includes the steps of:

(b1) determining whether a charging subscriber is the caller or the receiver based on charging data in their respective subscriber information;

(b2) checking whether there is TN selection data in the subscriber information of the determined charging subscriber;

(b3) if there is the TN selection data, producing it as the first TN selection data, and if otherwise, checking whether there is TN selection data in the subscriber information of the caller;

(b4) if there is the TN selection data in the subscriber information of the caller, generating it as the first TN selection data, and if not, testing whether there is TN selection data in the subscriber information of the receiver; and (b5) if there is the TN selection data in the subscriber information of the receiver, producing it as the first TN selection data, and if otherwise, producing the second TN selection data.

3. A method, for use in a mobile communications system (MCS), for generating routing information when a caller of a first electronic switching system (ESS) calls a receiver of a second ESS, wherein the routing information is used by the first ESS to choose one of a plurality of transit networks (TN's) between the ESS's, each TN having one or more other ESS's and trunks coupled between them, the method comprising the steps of:

(a) if there is a roaming information demand signal from the first ESS, deriving roaming information representing the location of the receiver, wherein the roaming information demand signal is generated when an identification code, indicating that the receiver is a mobile subscriber, is received by the first ESS from the caller, the identification code being contained in a dial number of the receiver;

(b) deciding whether a charging subscriber is the caller or the receiver based on charging data in subscriber information which is predetermined by each of the caller and the receiver;

(c) obtaining TN selection data based on the decision result and the subscriber information of the caller and the receiver, the TN selection data denoting one of the TN's, and generating the routing information by using the TN selection data and the roaming information.

4. The method of claim 3, wherein the step (c) includes the steps of:

(c1) checking whether there is TN selection data in the subscriber information of the decided charging subscriber;

(c2) if there is the TN selection data, producing the routing information by formatting it and the roaming information, and if otherwise, checking whether there is TN selection data in the subscriber information of the caller;

(c3) if there is the TN selection data in the caller subscriber information, generating the routing information by formatting it and the roaming information, and if not, testing whether there is TN selection data in the subscriber information of the receiver; and (c4) if there is the TN selection data in the subscriber information of the receiver, producing the routing information by formatting it and the roaming information, and if otherwise, producing the routing information by formatting TN selection data which is predetermined by the MCS and the roaming information.

5. A method, for use in a mobile communications system (MCS), for generating routing information when a caller of a first electronic switching system (ESS) calls a receiver of a second ESS, wherein the routing information is used by said first ESS to choose one of a plurality of transit networks (TN's) between the ESS's, each TN having one or more other ESS's and trunks coupled between them, the method comprising the steps of:

(a) translating, at said first ESS, a dial number of the receiver to identify the receiver as either a public switched telephone network (PSTN) subscriber or a mobile subscriber, wherein the dial number is issued when the caller calls the receiver and contains a network identification code, a country code, an area code, a station code and a subscriber number;

(b) if the receiver is identified as the mobile subscriber based on the translated result, sending a routing information demand (RID) signal and subscriber identification (SID) information of the receiver from said first ESS to a home location register (HLR);

(c) in response to the RID signal and the SID information, checking, at said HLR, whether roaming information representing the location of the receiver is in subscriber information prestored in the HLR by each of the caller and the receiver;

(d) if the roaming information is not in the subscriber information, sending a roaming information demand (ROID) signal and the SID information from said HLR to a visitor location register (VLR);

(e) in response to the ROID signal and the SID information, selecting, at said VLR, one of a set of roaming information which is prestored in the VLR and providing the selected roaming information to the HLR;

(f) if the roaming information is in the subscriber information at said checking step (c), sending the roaming information to said HLR;

(g) deciding, at said HLR, whether a charging subscriber is the caller or the receiver based on charging data in the subscriber information of the caller and the receiver; and (h) obtaining, at said HLR, TN selection data based on the decision result and the subscriber information of the caller and the receiver, the TN selection data denoting one of the TN's, and generating the routing information by using the TN selection data and either the roaming information in the HLR or the selected roaming information from the VLR.

6. The method of claim 5, wherein the step (h) includes the steps of:

(h1) checking whether there is TN selection data in the subscriber information of the decided charging subscriber;

(h2) if there is the TN selection data, producing the routing information by formatting it and either the roaming information in the HLR or the selected roaming information from the VLR, and if otherwise, checking whether there is TN selection data in the subscriber information of the caller;

(h3) if there is the TN selection data in the caller subscriber information, generating the routing information by formatting it and either the roaming information in the HLR or selected roaming information from the VLR, and if not, testing whether there is TN selection data in the subscriber information of the receiver; and (h4) if there is the TN selection data in the subscriber information of the receiver, producing the routing information by formatting it and either the roaming information in the HLR or the selected roaming information from the VLR, and if otherwise, producing the routing information by formatting TN selection data which is predetermined by the MCS and either the roaming information in the HLR or the selected roaming information from the VLR.

7. A method, for use in a mobile communications system (MCS), of selecting one from among a plurality of transit networks to carry a call between a caller associated with a first electronic switching system (ESS) and a receiver associated with a second electronic switching system, the method comprising the steps of:

(a) retrieving subscriber information about the caller and the receiver;

(b) determining whether the caller or the receiver is a charging subscriber who is to be charged for a call, based on said subscriber information; and (c) determining whether the subscriber information of the charging subscriber specifies which of said plurality of transit networks is to be used and, if so, selecting the transit network specified by the charging subscriber's subscriber information to carry the call between the caller and the receiver; and (d) if the subscriber information of the charging subscriber does not indicate that a particular transit network be used, determining whether the subscriber information about the caller specifies which of said plurality of transit networks is to be used and, if so, selecting the transit network specified by the caller's subscriber information to carry the call between the caller and the receiver.

8. The method of claim 7, comprising the additional step of:

(e) if the subscriber information of neither the charging subscriber nor the caller specifies which of said plurality of transit networks is to be used, determining whether the subscriber information of the receiver specifies which of said plurality of transit networks is to be used and, if so, selecting the transit network specified by the receiver's subscriber information to carry the call between the caller and the receiver.

9. The method of claim 8, comprising the additional step of:

(f) if the subscriber information of neither the caller nor the receiver specify which of said plurality of transit networks is to be used, selecting a default transit network to carry the call between the caller and the receiver.

* * * * *